March 18, 1930.  W. G. WILSON  1,751,261
SPRING
Filed Oct. 3, 1928   2 Sheets-Sheet 1

INVENTOR.
Wylie G Wilson
BY James L. Stewart
ATTORNEYS.

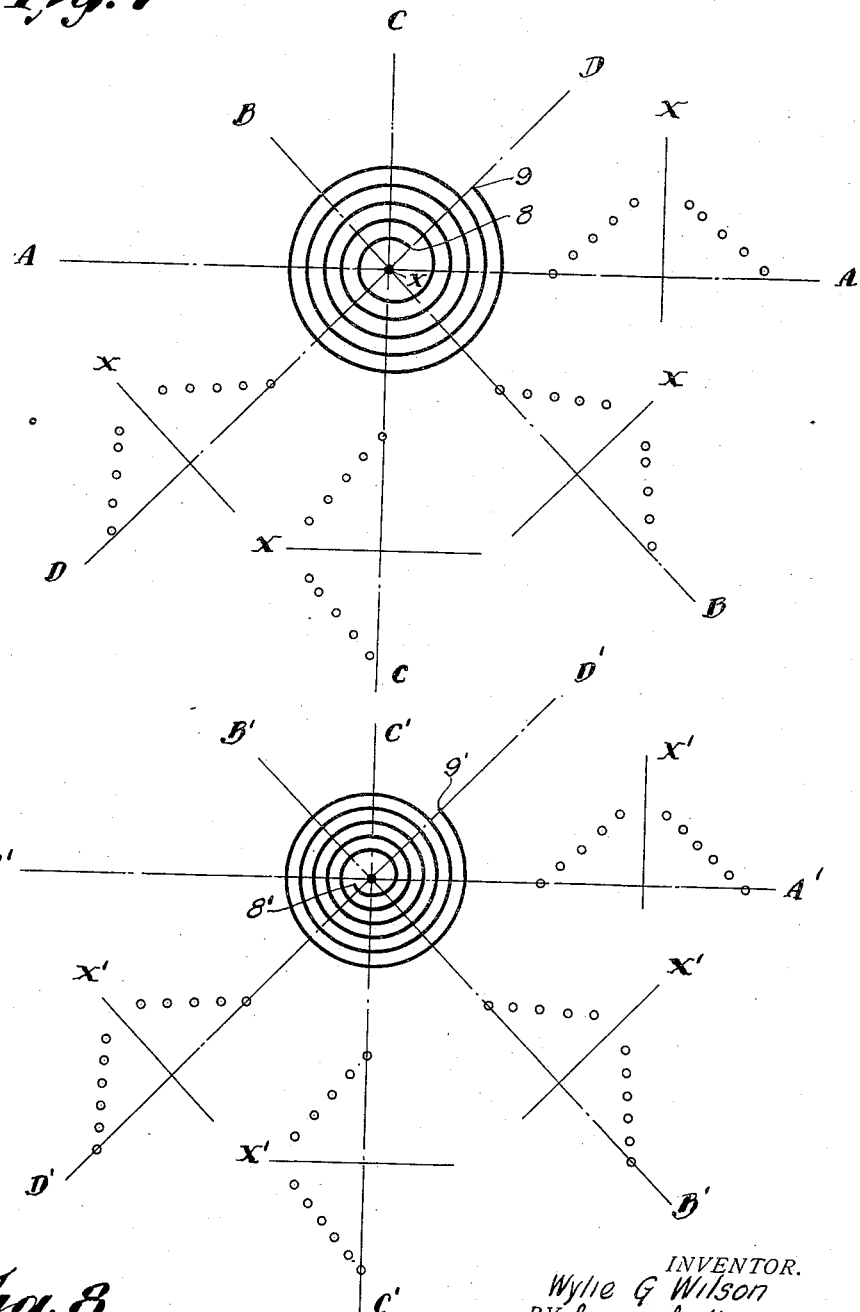

Patented Mar. 18, 1930

1,751,261

UNITED STATES PATENT OFFICE

WYLIE G. WILSON, OF JERSEY CITY, NEW JERSEY, ASSIGNOR TO EVERLASTING VALVE COMPANY, A CORPORATION OF NEW JERSEY

SPRING

Application filed October 3, 1928. Serial No. 310,170.

This invention comprises a new article of manufacture which may generically be referred to as a spring, and specifically as a type of spring having distinctive features or characteristics which make it adaptable for various uses.

The spring in question is made in the form of a progressive helix or hollow cone, the convolutions of said helix being such that when the spring is axially compressed said convolutions will pass each other in adjacent relation but without contact, and when fully compressed such convolutions will lie in a common plane. Details of construction and operation will be more fully described later.

The utility of the invention resides primarily in the constitution of a spring which may be interposed between relatively movable parts in order to maintain the same in resilient relation. Its specific characteristics are that it operates within a relatively short axis and that it functions within relatively narrow limitations so that the same may be interposed between relatively movable parts that are adjacent one another. The spring is seated on a broad base and is therefore not easily tilted or distorted from its primary position and, when axially compressed, the convolutions of the spring pass each the other without contact, and when fully compressed between relatively movable faces such convolutions lie in a common plane, the width of the spring under such conditions corresponding to the cross section diameter of the wire of which the spring is formed, and when released from such compression moves along the line of a relatively short axis to a point of repose with relatively great length of resilient movement. It may be noted also that, owing to the long radius of the bending action when the spring is compressed, it is impossible to break the wire or other resilient material of which the spring may be made by repeated compression of the spring. It may also be noted that in the construction of such a spring, heavy resilient wire or other resilient material may be employed, thus producing a spring having any desired degree of resiliency, and having such stable qualities as to secure for it continuous operation without deterioration.

The spring in the instant case is so organized that when compressed along the line of its axis or retracted along the same line, the convolutions of said spring, while lying adjacent each to the other, are sufficiently separated so that they do not make contact, thus avoiding any frictional engagement or contact which might operate detrimentally in the abrasion of the surfaces of such convolutions in a way either to deteriorate a coating or plating, or to wear away the material of which such convolutions may be formed in such a way as to weaken the same.

Another advantage of the specific construction of the spring of the instant case is that the termini of the said helix lie approximately in a plane parallel with the axis of said spring and common to one radius of said axis. It has been found that this construction and relation are of importance in the operation of such a spring.

It may be further said of this spring, in view of the fact that all the convolutions thereof lie in the same plane under conditions of complete compression, that the total crushing load is distributed over all the coils of its convolutions, and consequently the spring of the instant case will withstand without injury a total crushing load which would completely destroy and distort a spring in which any one coil overlay any other coil when the spring was fully compressed and subjected to crushing pressure.

The spring of this invention should not be confused with conventional conical helical springs such as have heretofore been suggested and used in various ways. Prolonged experimentation and research with such conical helical springs has fully demonstrated that when such prior springs are placed under axial compression between parallel surfaces, they invariably react in a direction which is not truly perpendicular to these surfaces, with the result that their small ends will creep and bring about pressure in opposite directions which is perpendicular to neither of the surfaces between which the spring is acting. The spring of the present invention must be not only of conical, helical shape and the convolutions must not only be so related to one another that the spring may be collapsed into a common plane without adjacent convolutions contacting with one another, but the spring must also be so formed that the termini of the helix lie in a plane parallel to the axis of the spring and common to one radius of said axis. Furthermore, it is preferable that the successive convolutions of the spring be arranged in arithmetical progression with respect to the radial distances of such convolutions.

When such a spring is compressed between parallel surfaces, the spring will react in a truly perpendicular relation with respect to said surfaces and there will be no tendency whatsoever for the spring to tilt or creep laterally.

Features of the invention, other than those specified, will be apparent from the hereinafter description and claims when read in conjunction with the accompanying drawings.

The accompanying drawings illustrate the preferred practical embodiment of the invention and the structure therein shown is to be understood as illustrative only and not as defining the limits of the invention.

Figures 7 and 8 are diagrammatic views wherein the structure of the spring of this invention is compared with conical, helical springs of the prior art.

Figure 1:
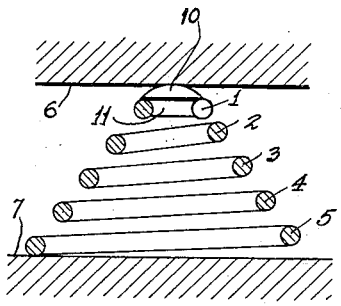
Figure 1 is a vertical section of the spring embodying this invention with an anti-friction stud attached thereto, such spring and stud being interposed between two relatively movable surfaces, and the spring being shown as fully expanded.
Figure 2:
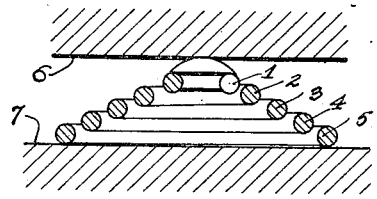
Figure 2 is a vertical section of the spring shown in Figure 1, but with the spring partially compressed.
Figure 3:
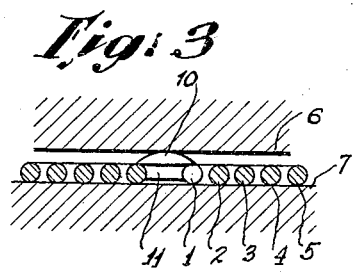
Figure 3 shows the spring fully compressed.

In the accompanying drawings, Figure 1 shows the spring free of compression. Figure 2 shows it substantially one-half compressed and Figure 3 shows it fully compressed. It will be noted from these figures that the spring is in the form of a progressive helix or hollow cone. This helix, while unitary, is composed of what are called convolutions. They are designated by the reference characters 1, 2, 3, 4 and 5 in Figures 1 to 3. The convolutions 1 to 5 are the terminal convolutions of the spring.

6 and 7 indicate diagrammatical faces which it is desired to maintain in resilient relation. The spring is interposed between these faces and one or both of these faces are capable of movement in a direction parallel to the axis of the spring. It is desired to maintain these faces in parallel relation to one another during such movement and the members on which the faces are formed will, of course, vary in accordance with the different environments in which the spring is used.

Particular attention is called to two fundamental characteristics of the present spring, viz: the convolutions are so formed that when the spring is placed under compression between the surfaces 6 and 7, the convolutions thereof, while adjacent each to the other, do not contact with one another and when fully compressed, as illustrated in Figure 3, all convolutions lie in a common plane, the depth of which corresponds to the diameter of the wire from which the spring is formed. Under these conditions, it will be obvious that the spring may be subjected to a crushing strain without injury to the convolutions or to the spring as a whole, and when such strain is relieved it will react along the line of the axis of the spring.

Figure 4:
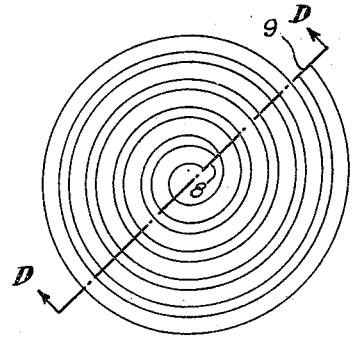
Figure 4 is a plan view of the spring without the anti-friction stud.

I also particularly call attention to the fact that the termini 8 and 9 of the spring are positioned approximately in a plane parallel with the axis of the spring and common to one radius of said axis as shown by the line D—D in Figure 4. This latter feature is of marked importance as will be apparent from the following discussion of the diagrammatic figures of the drawings.

Figure 7 shows a diagrammatic plan view of the spring of this invention and I have passed through the axis X a number of lines indicating planes which intersect said axis. These planes are designated A—A, B—B, C—C, and D—D and associated with each of these lines, I have shown the section of the spring in the corresponding plane. Particular attention is called to the fact that in the four sections illustrated, the spring is symmetrical about its axis in each instance. In other words, in each of these four sections, there are the same number of convolutions of the spring on each side of the axis. This is brought about by the fact that the termini 8 and 9 of the spring are positioned in substantially the plane D—D and at one and the same side of the axis X.

In order that the arrangement of the spring of this invention, which is clearly apparent in Figure 7, may be compared with conventional, conical, helical springs known to the arts in general, I have shown the usual spring construction diagrammatically in Figure 8 in a manner corresponding to the showing in Figure 7, and have opened up the convolutions somewhat to make the comparison clearer. In these two Figures (7 and 8), like parts are designated by like reference characters with primes in the latter figure.

It will be noted that in Figure 8, the terminal 9' at the large end of the helix is at substantially the plane D'—D', while the terminal 8' at the small end of the helix is at substantially the plane A'—A'. This is a manner commonly employed in the various arts in the manufacture of conical, helical springs and the result is that the several sections taken at the planes designated show a non-symmetrical formation at each side of the axis of the spring in each instance. Note, for example, the section at the plane A'—A'. There is one more convolution at the right hand side of the axis X' than at the left hand side.

It will thus appear from a comparison of Figures 7 and 8 that while applicant's spring is symmetrical throughout, the conical springs of the prior art are not so constructed.

Figure 5:
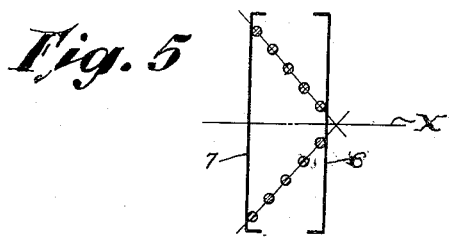
Figures 5 and 6 are diagrammatic views collectively affording a comparison between the mode of operation of the present spring and the manner in which conical, helical springs of the prior art operated in the same environment.

This difference renders the springs of the prior art inoperative to properly function in environments wherein the spring of this invention functions with the highest utility. The reasons for these differences in the practical application of the invention between relatively movable surfaces 6 and 7 are rendered clearly apparent from a comparison of Figures 5 and 6. When my spring is compressed between the surfaces 6 and 7, the fact that the spring is symmetrical about its axis X will make all portions of the spring uniformly compressible with a resultant axial reaction along the line X which will be perpendicular to both surfaces 6 and 7. There will thus be no tendency of the spring to tilt nor any tendency of the spring to exert any more pressure on one side of the axis than on the other side thereof. Moreover, there will be no tendency of the spring to tilt either of the surfaces 6 and 7 and as a result, these surfaces will be maintained in parallel relation.

Figure 6:
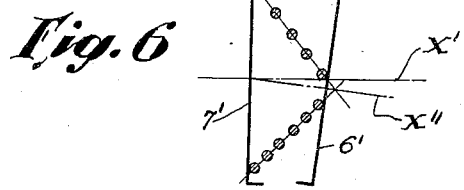

If reference is now had to Figure 6, it will be noted that the same conditions do not there exist for the spring is not symmetrical about the axis X'. Here, for the purpose of illustration, the section shown is as taken in the plane A'—A' of Figure 8, so that there are six convolutions on one side of the axis X' and only five on the other side of said axis. As a result, the side having five convolutions will apply a greater pressure than the side having six convolutions so that there is a tendency to tilt the surface 6' and 7' as shown and to tilt the axis of the spring as shown at X''.

It will thus be apparent that the spring of the present invention is capable of performing functions and also of operating in a manner wholly distinct from and not performable by springs as heretofore constructed. The ability of the spring to thus function is due to the novel features to which I have referred.

It is desirable that the convolutions of the spring of this invention be so disposed about the central axis of the spring that radii emanating from said axis in planes perpendicular to said axis engage said convolutions at distances from said axis in arithmetical progression. This is stated as a general rule and for the purpose of making clear the exact construction of the spring. Of course slight variations from this formula would not depart from the spirit of the invention. It is, however, of the first importance that the said progressive helix of said hollow cone should be formed so that the convolutions of said helix, when axially compressed, will pass each the other in adjacent relation but without contact so that when fully compressed said convolutions will lie in a common plane.

It is also desirable that the termini of said helix shall lie approximately in a plane parallel with said axis and common to one radius of said axis. Satisfactory results may be attained when the said termini are not exactly in the plane of a common radius, but experience has demonstrated that the position indicated is the most suitable to accomplish the purposes contemplated.

In Figures 1 to 3 of the drawings, the small end of the spring is shown as provided with a stud to bear against the surface 6. This stud is shown as having a hemispherical head 10 of sufficient diameter to bear upon the uppermost convolution 1 and this head is provided with a shank 11 which extends into the uppermost convolution and is preferably formed with a circumferential channel in which the uppermost convolution seats to hold the stud against inadvertent displacement when the spring is removed from between the surfaces 6 and 7. In many practical uses of the spring, the stud is found desirable although the invention is not limited to the use thereof.

Figure 9:
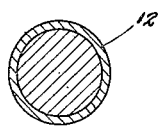
Figure 9 is a cross-section of the wire from which the spring is formed, showing same with a protecting coating or covering.

The construction of the present spring in such manner that when fully compressed the successive convolutions will not engage with one another makes it possible to provide the spring with a coating indicated at 12 in Figure 9 which coating may be of any suitable non-corrosive substance, and the purpose of which is to fully protect the spring against corrosive attack. When the spring is compressed, the convolutions will not touch one another and consequently the coating will not be abraded or worn away as would be the case in spring constructions of the prior art.

It will also be noted that in the spring as shown in the drawings the rod or wire from which the spring is formed is of uniform diameter throughout its entire length so as to impart uniformity of operation to the spring.

The foregoing detailed description sets forth the invention in its preferred practical form and the invention is to be understood as fully commensurate with the appended claims.

Having thus fully described the invention, what I claim as new and desire to secure by Letters Patent is:

1. A new article of manufacture comprising a spring in the form of a progressive helix or hollow cone, the convolutions of said helix being such that when the spring is axially compressed said convolutions can pass each the other without contact, the termini of said helix lying approximately in a plane parallel with said axis and common to one radius of said axis.

2. A new article of manufacture comprising a spring in the form of a progressive helix or hollow cone, the convolutions of said helix being such that when the spring is axially compressed said convolutions can pass each other without contact, and when fully compressed such convolutions will lie in a common plane, the termini of said helix lying approximately in a plane parallel with said axis and common to one radius of said axis.

3. A new article of manufacture comprising a spring in the form of a progressive helix or hollow cone, the convolutions of said helix being such that when the spring is axially compressed said convolutions can pass each the other in adjacent relation, but without contact, and when fully compressed such convolutions will lie in a common plane, said convolutions being so disposed about a central axis that radii emanating from said axis in planes perpendicular to said axis engage said convolutions at distances from said axis in arithmetical progression.

4. A new article of manufacture comprising a spring in the form of a progressive helix or hollow cone, the convolutions of said helix being such that when the spring is axially compressed said convolutions can pass each the other in adjacent relation, but without contact, and when fully compressed such convolutions will lie in a common plane, said convolutions being so disposed about a central axis that radii emanating from said axis in planes perpendicular to said axis in arithmetical progression, the termini of said helix lying approximately in a plane parallel with said axis and common to one radius of said axis.

5. A new article of manufacture comprising a spring in the form of a progressive helix or hollow cone, the convolutions of said helix being such that when the spring is axially compressed said convolutions can pass each the other in adjacent relation, but without contact, and when fully compressed such convolutions will lie in a common plane, said convolutions being so disposed about a central axis that radii emanating from said axis in planes perpendicular to said axis engage said convolutions at distances from said axis in arithmetical progression, said spring having at its apex an axial aperture, and a stud having a suitable head provided with a shank fitting loosely into said aperture with the head engaging the apex of said spring.

6. A new article of manufacture comprising a spring in the form of a progressive helix or hollow cone, the convolutions of said helix being such that when the spring is axially compressed said convolutions can pass each the other in adjacent relation, but without contact, and when fully compressed such convolutions will lie in a common plane, said convolutions being so disposed about a central axis that radii emanating from said axis in planes perpendicular to said axis engage said convolutions at distances from said axis in arithmetical progression, the termini of said helix lying approximately in a plane parallel with said axis and common to one radius of said axis, said spring having at its apex an axial aperture, and a stud having a suitable head provided with a shank fitting loosely into said aperture with the head engaging the apex of said spring.

7. A new article of manufacture, comprising a spring in the form of a progressive helix or hollow cone, the convolutions of said helix being such that when the spring is axially compressed said convolutions can pass each the other in adjacent relation, but without contact, and when fully compressed such convolutions will lie in a common plane, said convolutions being so disposed about a central axis that radii emanating from said axis in planes perpendicular to said axis engage said convolutions at distances from said axis in arithmetical progression, the termini of said helix lying approximately in a plane parallel with said axis and common to one radius of said axis, said spring having at its apex an axial aperture, and a stud having a suitable head provided with a shank fitting loosely into said aperture with the head engaging with the apex of said spring, with means for securing said stud against displacement from said aperture.

Signed by me at Jersey City, this 28th day of September, 1928.

WYLIE G. WILSON.